3,511,805
RUBBER PRESERVED WITH ALICYCLICMETHYL PHENYLENEDIAMINES
Milton Kosmin, Creve Coeur, Mo., and John R. Le Blanc, Wilbraham, Mass., assignors to Monsanto Company, St. Louis, Mo., a corporation of Delaware
No Drawing. Original application Apr. 18, 1963, Ser. No. 273,831, now Patent No. 3,283,006, dated Nov. 1, 1966. Divided and this application Oct. 21, 1965, Ser. No. 516,183
Int. Cl. C08f *45/60;* C10l *1/22;* A01n *9/20*
U.S. Cl. 260—45.9        5 Claims This application is a division of application Ser. No. 273,831, now U.S. Pat. No. 3,283,006 issued Nov. 1, 1966.

This invention relates to a new class of phenylenediamines and to methods for their preparation. More particularly, the present invention relates to alicyclicmethyl phenylenediamines. Typical of the new substances may be represented by the general formula

where R represents an alicyclic radical, preferably one containing six ring carbon atoms, X represents $C_6H_5$ or R—$CH_2$, R having the same significance as before.

Amines having the above formula are readily prepared by reductive alkylation of a phenylenediamine with the appropriate alicyclic carboxaldehyde. Preferred reactants are cyclohexenecarboxaldehydes because of their ready formation from cheap available raw materials.

Cyclohexenecarboxaldehydes result from Diels Alder additions of a diene to an unsaturated aldehyde. For example, condensation of butadiene with acrolein yields 3-cyclohexenecarboxaldehyde. Any of a variety of dienes can be used in this condensation, as for example isoprene, 2,4-hexadiene, cyclopentadiene, 2,3-dimethylbutadiene and 2-methylpentadiene to produce 4-methyl-3-cyclohexenecarboxaldehyde, 2,5-dimethyl-3-cyclohexenecarboxaldehyde, 2,5-endomethylene-3-cyclohexenecarboxaldehyde, 3,4-dimethyl-3-cyclohexenecarboxaldehyde and 2,4-dimethyl-3-cyclohexenecarboxaldehyde respectively. Crotonaldehyde condensed with butadiene yields 2-methyl-3-cyclohexenecarboxaldehyde. The above 2,5-dimethyl-3-cyclohexenecarboxaldehyde can also be obtained from crotonaldehyde and isoprene. Still other unsaturated aldehydes suitable as reactants are 1,2-dimethylcyclopenten-3-aldehyde-3, 2-methyl-3-cyclohexenecarboxaldehyde and 3-methyl-3-cyclohexenecarboxaldehyde.

It will, of course, be appreciated that it is unnecessary to start with an unsaturated aldehyde. The unsaturation disappears in the reduction step and where desired saturated aldehyde may be employed, as for example, cyclohexanecarboxaldehyde, and o-, m- and p-methylcyclohexanecarboxaldehyde. While Raney nickel is a satisfactory catalyst for the reductive alkylation, other catalysts, as for example Pt and Pd may be substituted.

The following examples illustrate the preparation and use of the compounds:

EXAMPLE 1

To a 2-liter flask equipped with stirrer, thermometer and condenser protected with Drierite (anhydrous calcium sulfate dessicant) and Ascarite (sodium hydroxide-asbestos absorbent for carbon dioxide) is charged 184 grams (1.0 mole) of N-phenyl-p-phenylenediamine and 400 cc. of absolute alcohol. The mixture is stirred while adding 220 grams (2.0 moles) of 3-cyclohexenecarboxaldehyde (about 20 cc. at a time). During the addition a temperature rise from 27 to 39° C. is noted. Anhydrous sodium acetate (20 grams) is then added and the mixture heated to reflux and held there for one hour. Thereupon the mixture is transferred to a 3-liter stainless steel autoclave together with 14 grams of Raney nickel catalyst. The autoclave is sealed and purged three times with hydrogen (300 pounds pressure per square inch, gauge). The autoclave is then heated and agitated (by rocking) as follows: From an initial temperature of 28° C. at which the hydrogen pressure is 2510 p.s.i.g., the autoclave is gradually heated to 87° C. over a period of about 105 minutes. Heating is continued for about 8½ hours at 81–87° C. Heating and stirring are then discontinued and after about 8 hours the autoclave is opened, the bulk of the solids removed and the remainder flushed out with absolute alcohol (1 liter). The solids are filtered, the filtrate reserved, and the filter cake washed with water to remove sodium acetate. Part of the organic solid is dissolved in ether (about 500 cc.) and the remainder in benzene (approximately 500 cc.). The catalyst is removed by filtration of the ether and benzene solutions. The ether solution is evaporated almost to dryness, the solids filtered and dried in a vacuum oven overnight. A white solid (60 grams) is obtained melting at 96–99° C., Crop No. 1. The ether filtrate is combined with the benzene solution. The combined solution is partially evaporated, filtered and dried to yield 15 grams of slightly purple solid melting at 96–97° C., Crop No. 2. The alcoholic filtrate reserved above is cooled to −20° C., filtered and the solids dried in a vacuum oven at 50° C. to yield 33.5 grams of deep purple solid, M.P. 94.5–96° C., Crop No. 3. The alcoholic filtrate and the benzene ether filtrates are combined and the solvents distilled at atmospheric pressure through an 8″ x 1″ Vigreux column. The residue is fractionated through the same column. Low boiling material, 111 grams, distills at 79–80° C./10 mm. and 2 grams distill at 125–200° C./0.5 mm. Fractions are collected as follows:

| Cut No.: | Pot Temp. | Head Temp. | Pressure | Grams | Remarks |
| --- | --- | --- | --- | --- | --- |
| 1 | 205–217 | 172–194 | 0.32 | 6.5 | Solid. |
| 2 | 220–233 | 199–210 | 0.32 | 15.0 | Do. |
| 3 | 235–245 | 210.5 | 0.33 | 85.0 | Do. |
| 4 | 250 | 215 | 0.35 | 9.0 | Do. |

NOTE.—Residue=13 grams.

Cut No. 3 is dissolved in 200 cc. of absolute alcohol (hot), cooled to −10° C., filtered and washed with two 50 cc. portions of absolute alcohol, netting 69 grams of material M.P. 96–98° C. Mixture melting point with Crop No. 1 is 96.5–98° C., indicating the products are identical. Cut No. 2 combined with Crop No. 2 and crystallized from alcohol yields 22 grams of product M.P. 96–98° C. Crop No. 3 and cuts 1 and 4 are combined and recrystallized from alcohol, netting 29 grams of slightly purple material, M.P. 95–97° C. Overall yield is 180.5 grams or 64.5%. Analysis of Crop No. 1: 80.96% carbon, 8.77% hydrogen and 10.02% nitrogen as compared to 81.4% carbon, 8.58% hydrogen and 10.00% nitrogen calculated for $C_{19}H_{24}N_2$. Infrared analysis confirms that the product is the desired N-cyclohexylmethyl-N′-phenyl-p-phenylenediamine.

EXAMPLE 2

To a 1-liter, stainless steel autoclave is charged 92 grams (0.5 mole) of N-phenyl-p-phenylenediamine, 72 grams (0.58 mole) of 1-methyl-3-cyclohexenecarboxaldehyde, 7 grams (including some alcohol) of Raney nickel catalyst, 200 cc. of absolute alcohol and 14 grams of anhydrous sodium acetate. The autoclave is then sealed, purged twice with hydrogen under 300 pounds pressure per square inch, gauge, and then pressurized with hydrogen to 1600 pounds pressure per square inch, gauge. The autoclave is heated with rocking for about 2 hours during which time the temperature is increased from 50° C. to 102° C. At this temperature the pressure is 1400 p.s.i.g. and drops to 1250 p.s.i.g. after about 45 minutes further heating. The autoclave is emptied and flushed out with alcohol. Catalyst and solid sodium acetate are removed by filtration of the alcohol solution. The alcohol is distilled, about 250 cc. of benzene added to the residue and the resulting solution washed with two 50 cc. portions of distilled water. The water washings are extracted with 50 cc. of benzene and the benzene solutions combined. Water is azeotroped off and the benzene distilled. The residue is fractionated using an 8" x 1" Vigreux column. Cuts 1 and 2 are unreacted material which distill at a pot temperature of 205° C., head temperature 170° C., 0.12–0.17 mm. pressure. Cuts 3, 4 and 5 distill at 170–207° C./0.13–0.17 mm. The residue is 5 grams. Cuts 3, 4 and 5 (95.5 grams) are combined and fractionated through a column packed with glass helices. The first cuts comprise 13.5 grams of additional unreacted starting material. This is obtained at a pot temperature of 255–280° C., head temperature 150–202° C., at 0.20–0.23 mm. pressure. The remaining cuts are as follows:

| Cut No.: | Pot temp. | Head temp. | Pressure | Grams |
|---|---|---|---|---|
| 2 | 280 | 213 | 0.27 | 29.5 |
| 3 | 280 | 218 | 0.20 | 10 |
| (Vigreux column replaces helices packed column to reduce holdup) | | | | |
| 4 | 240 | 199 | 0.12 | 36.5 |

The center cut is induced to crystallize by cooling in Dry Ice and scratching on the bottom of the flask. The crystals, M.P. 39–40° C., are then used to seed the remainder. Cut No. 4 melts at 40–41° C. but Cut No. 2 has a lower melting point. The lower melting material is combined with Cut No. 3 and the mixture dissolved in 200 cc. of hot heptane (40° C.) and the solution cooled to −10° C., filtered, the solids washed with cold (−20° C.) heptane and dried, M.P. 38–40° C. A second crop is obtained by cooling again to −20° C., washing the cake with cold heptane (−20° C.) and drying as before, M.P. 37–39° C. Overall yield is 41.2% based on the N-phenyl-p-phenylenediamine.

*Analysis.*—9.60% nitrogen compared to 9.53% calculated for $C_{20}H_{26}N_2$.

Infrared analysis shows no evidence of C=N unsaturation and otherwise confirms that the product is the desired N - (1-methylcyclohexyl) - methyl-N'-phenyl-p-phenylenediamine.

Replacing the aldehyde by 4-methyl-3-cyclohexenecarboxaldehyde, 4,6,6 - trimethylcyclohexenecarboxaldehyde, 3-methyl-3-cyclohexenecarboxaldehyde and 2,5-dimethyl-3-cyclohexenecarboxaldehyde yields N,4-methylcyclohexylmethyl-N'-phenyl-p-phenylenediamine, N,4,6,6-trimethylcyclohexylmethyl - N' - phenyl-p-phenylenediamine, N,3-methylcyclohexylmethyl-N'-phenyl-p-phenylenediamine and N,2,5 - dimethylcyclohexylmethyl - N'-phenyl-p-phenylenediamine respectively.

EXAMPLE 3

To a 1-liter, 3-neck, round bottom flask equipped with stirrer, condenser and thermometer is charged 300 cc. of absolute alcohol and 81 grams (0.75 mole) of p-phenylenediamine. 3-cyclohexenecarboxaldehyde, 235 grams (2.13 moles), is added slowly with vigorous stirring causing the temperature to rise from 27 to 50° C. Then there is added 30 grams of anhydrous sodium acetate, the mixture heated to reflux and held there for one hour. The mixture is then cooled to 35° C. and transferred to a 1 liter stainless steel autoclave with 20 grams of Raney nickel catalyst. The autoclave is sealed, purged three times with hydrogen (500 p.s.i.g.), pressurized with hydrogen (3125 p.s.i.g.) and then heated with rocking. The temperature is gradually increased from 32° C. to 145° C. over about 90 minutes. After about 30 minutes the pressure drops to 1175 p.s.i.g. and is increased to 2300 p.s.i.g. and then after about an hour when the hydrogen pressure has dropped to 2100 p.s.i.g. at 120° C. it is increased to 3400 p.s.i.g. There is no further pressure drop after heating about 20 minutes at 140–145° C. The autoclave is cooled, vented and opened. Most of the solid is dug out and the remainder rinsed out with absolute alcohol. The combined solid is filtered and washed with 1.5 liters of distilled water in a Waring blender to remove sodium acetate. The remaining solid is dissolved in approximately 1.5 liters of boiling absolute alcohol, filtered hot to remove the catalyst, cooled to 10° C., filtered and dried in a vacuum oven. N,N'-di(cyclohexylmethyl) - p-phenylenediamine melting at 124.5–125° C. after recrystallization from hot alcohol is obtained. A second crop of light purple material meals at 124–125.5° C. The melting point is not depressed by admixture with the first crop.

*Analysis.*—79.55% carbon and 11.04% hydrogen compared to 80.0% carbon and 10.67% hydrogen calculated for $C_{20}H_{32}N_2$.

Infrared analysis confirms absence of C=C and C=N unsaturation and presence of NH, alicyclic CH and p-substituted phenylene.

EXAMPLE 4

Although this example illustrates the use of zinc chloride as a catalyst, the catalyst is unnecessary if water is removed by distillation during the preparation of intermediate Schiff's base. In about 10 ml. of ethanol is dissolved 1.85 grams of N-phenyl-p-phenylenediamine. To this is added 0.7 gram of zinc chloride, with stirring to precipitate the catalyst complex. The catalyst complex is then filtered and washed with ethanol. This complex is charged to a glass reactor containing 61.1 grams (0.5 mole) of 2,5-endomethylenetetrahydrobenzaldehyde. To the stirred mixture is added 92 grams (0.5 mole) of N-phenyl - p - phenylenediamine, slowly initially, and then more rapidly when the reaction appears to be under control. The temperature rises to 40° C. and formation of water becomes noticeable. A vacuum of 40–55 ml. is then maintained on the reaction vessel. Over a period of about 75 minutes, during which the temperature of the reaction mixture is increased from 40 to 90° C., about 8.3 ml. of water is collected (92.2% of theory). An additional 5 ml. of aldehyde is added to the reaction mixture near the end of the reaction period to insure completion of the reaction and compensate for aldehyde which azeotropes with water. The reaction mixture is then quickly heated to 135° C./40 mm. to strip off unreacted aldehyde. The product is then diluted with 250 ml. of ethanol and charged to a stainless steel autoclave together with 14 grams Raney nickel catalyst and 100 ml. of absolute alcohol. The autoclave is purged with hydrogen and hydrogenation proceeds as follows: Over a period of about 370 minutes during which the temperature is increased from 40 to 110° C. the pressure drops from 1800 p.s.i.g. to 1600 p.s.i.g. The autoclave is then emptied, catalyst filtered, the alcohol distilled and the residue stripped to a final pot temperature of 130° C./1.0 mm. The residue is 143.5 grams (98.3% of theory) of N,2,5-endomethylenehexahydrobenzyl - N' - phenyl - p - phenylenediamine. Infrared data demonstrate that the product is essentially pure.

The new compounds are valuable for the preservation of substances which deteriorate by absorption of oxygen from the air, as for example rubber, gasoline, vegetable oil, carotene and the like. Rubbers in which the compounds may be used include hydrocarbon rubbers such as ethylene-propylene copolymer rubber, butyl rubber which is a copolymer of isobutylene and a small amount, not more than 15% of conjugated diolefin, usually isoprene, natural rubber, cis-polybutadiene, cis-polyisoprene and styrene-butadiene copolymer rubber. The new compounds are particularly valuable for preservation of sulfur vulcanizable diene rubbers, i.e. rubbers in which more than 50% of the monomer constituents of which they are composed are diene hydrocarbons. Natural rubber contains natural antioxidants which protect the unvulcanized product but synthetic rubbers require addition of an antidegradant immediately after they are formed. The new compounds not only protect unvulcanized rubber but their protective action continues into the vulcanized product. The compounds possess adequate thermal stability to survive the vulcanization process. Most importantly the new compounds protect vulcanizates of natural and synthetic rubbers from the action of ozone. In general, amounts within the range of 0.005% to 5% of the substance to be preserved are used to protect against various types of degradation encountered.

As a specific embodiment of the invention illustrating the antidegradant properties, a rubber base composition is compounded comprising:

Base Stock A
parts by weight
Smoked sheets rubber _____ 100
Carbon black _____ 50
Zinc oxide _____ 5
Stearic acid _____ 3
Saturated hydrocarbon softener _____ 3
Sulfur _____ 2.5
N-cyclohexyl-2-benzothiazolesulfenamide _____ 0.5

To the base stock is added 1.5 parts by weight of antidegradant and the compositions cured by heating in a press for 45 minutes at 144° C. The stocks are then aged 72 hours in an air oven at 100° C. and the proportion of the original tensile strength retained after aging observed. The results are recorded in Table I.

Table I
Antidegradant                                  Percent tensile retained
Commercial control _____ 17
N-(1-methylcyclohexyl)methyl-N'-phenyl-
  p-phenylenediamine _____ 25
N-cyclohexylmethyl-N'-phenyl-p-phenylenediamine __ 21

To demonstrate anti-exposure cracking properties, tests are conducted employing the above-described natural rubber base Stock A and a rubber base stock comprising:

Base Stock B
parts by weight
SBR 1500 rubber _____ 100
Carbon black _____ 50
Zinc oxide _____ 4
Stearic acid _____ 2
Saturated hydrocarbon softener _____ 10
Sulfur _____ 1.75
N-cyclohexyl-2-benzothiazolesulfenamide _____ 1.2

SBR 1500 is styrene-butadiene copolymer rubber, the bound styrene content of which is 23.5%. Antioxidant is added but this has no significant effect in preventing exposure cracking. To the base stocks is added 1.5 parts by weight of antidegradant and the compositions cured by heating in a press for 45 minutes at 144° C. Since evaluation under static conditions is not indicative of the service obtained with many types of rubber articles which must withstand flexing, the vulcanized compositions are evaluated under dynamic conditions in an atmosphere containing a definite concentration of ozone. The test is carried out in the following manner: Samples of the stocks are cured in the form of a belt ½ inch wide, ¼ inch thick and 5 3/16 inches inside diameter and mounted on 1 inch diameter shafts. The ozone concentration is maintained at 20–30 parts per hundred million throughout the test and the shafts rotated at 75 r.p.m. In this manner a momentary elongation through a range of 0–20% is provided at any portion of the test specimens passing over the shaft. Further details of the apparatus and procedure employed are described by Creed et al, in Analytical Chemistry, vol. 25, page 241, February 1953. The experimental test specimens are compared visually to previously selected standards at regular intervals, noting the extent of cracking. The standards represent different degrees of cracking on a numerical scale of 1–6 on which 1 means no cracking and 6 extremely severe cracking. Severity of cracking is assigned numerical rating in this manner. Curves obtained by plotting the severity of cracking on the Y axis in inverse order versus time of exposure on the X axis, provide a convenient representation of the relationship between severity of cracking and time. Comparative results are obtained by determining the area under the curve and comparing to the area under the curve for a selected control. The results are expressed on the basis of a control stock containing a commercial antidegradant as 100.

TABLE II

| | Protection rating against ozone | |
|---|---|---|
| Antidegradant | Natural rubber, Base A | Styrene-butadiene copolymer, Base B |
| Commercial product | 100 | 100 |
| N-(1-methylcyclohexyl)methyl-N'-phenyl-p-phenylenediamine | 105 | 117 |
| N-cyclohexylmethyl-N'-phenyl-p-phenylenediamine | 105 | 117 |
| N,2,5-endomethylenehexahydrobenzyl-N'-phenyl-p-phenylenediamine | 106 | 117 |
| N,N'-di(cyclohexylmethyl)-p-phenylenediamine | 84 | 94 |

As further examples of the invention, natural rubber compositions are prepared similar to Base Stock A containing N-(1-methylcyclohexyl)methyl-N'-phenyl-p-phenylenediamine and N-cyclohexylmethyl-N'-phenyl-p-phenylenediamine except that the sulfur is reduced to 1.0 part and 1.0 part of 4,4'-dithiobismorpholine is added. The stocks are cured in a press at 144° C. for 60 minutes and then aged 48 hours at 100° C. in an air oven. The proportion of the original tensile strength retained after aging is observed. The vulcanizates are evaluated for anti-exposure cracking as aforedescribed. The results of the tests indicate tensile strength retained after air oven aging comparable to that retained by stocks containing known antioxidants and indicate ozone protection superior to stocks containing a commercial antiozonant. It is of interest that in antioxidant effectiveness N-cyclohexylmethyl-N'-phenyl-p-phenylenediamine is superior to the known commercial antioxidant N-cyclohexyl-N'-phenyl-p-phenylenediamine whereas N-(4-methylcyclohexyl)-N'-phenyl-p-phenylenediamine is inferior thereto.

The product of Example 1 is a fungicide toxic to *Monilinia fructicola* at a concentration of 200 parts per million. Applied at a concentration of 100 parts per million as a systemic fungicide at give excellent control of tomato wilt (*Fusarium lycopersici*). It was also observed that the product of Example 2 applied at a concentration of 0.001% resulted in 100% kill of yellow fever mosquito larvae. The new compounds are also valuable intermediates. Both secondary amino hydrogen atoms are reactive and permit the introduction of substituent radicals. For example, one or both the hydrogen atoms are replaced by nitroso radicals by reaction with sodium nitrite in cold acid medium. The nitroso compounds also prevent degradation of rubber.

It is intended to cover all changes and modifications of the examples of the invention herein chosen for purposes of disclosure which do not constitute departures from the spirit and scope of the invention.

What is claimed is:
1. Sulfur vulcanizable conjugated diolefin rubber having incorporated therein in amount sufficient to inhibit degradation, a compound of the structure

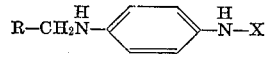

where R is selected from a group consisting of cyclohexyl and methylcyclohexyl and X is selected from a group consisting of phenyl and R—CH₂ where R has the same meaning as above.

2. Sulfur vulcanizable diene rubber selected from the group consisting of natural rubber and styrene-butadiene rubber having incorporated therein in amount sufficient to inhibit degradation, N-(1-methylcyclohexyl)methyl-N'-phenyl-p-phenylenediamine.

3. Sulfur vulcanizable diene rubber selected from the group consisting of natural rubber and styrene-butadiene rubber having incorporated therein in amount sufficient to inhibit degradation, N-cyclohexylmethyl-N-phenyl-p-phenylenediamine.

4. Sulfur vulcanizable diene rubber selected from the group consisting of natural rubber and styrene-butadiene rubber having incorporated therein in amount sufficient to inhibit degradation, N,N'-di(cyclohexylmethyl)-p-phenylenediamine.

5. Sulfur vulcanizable conjugated diolefin rubber having incorporated therein in amount sufficient to inhibit degradation, N,2,5 - endomethylenehexahydrobenzyl-N'-phenyl-p-phenylenediamine.

References Cited

UNITED STATES PATENTS 3,163,616  12/1964  Stahly _____ 260—45.9

FOREIGN PATENTS 1,156,464  5/1958  France.

HOSEA E. TAYLOR, Jr., Primary Examiner

U.S. Cl. X.R.

44—74; 99—163; 260—23.7, 809, 814, 577, 666.5; 424—325